Figure 1:
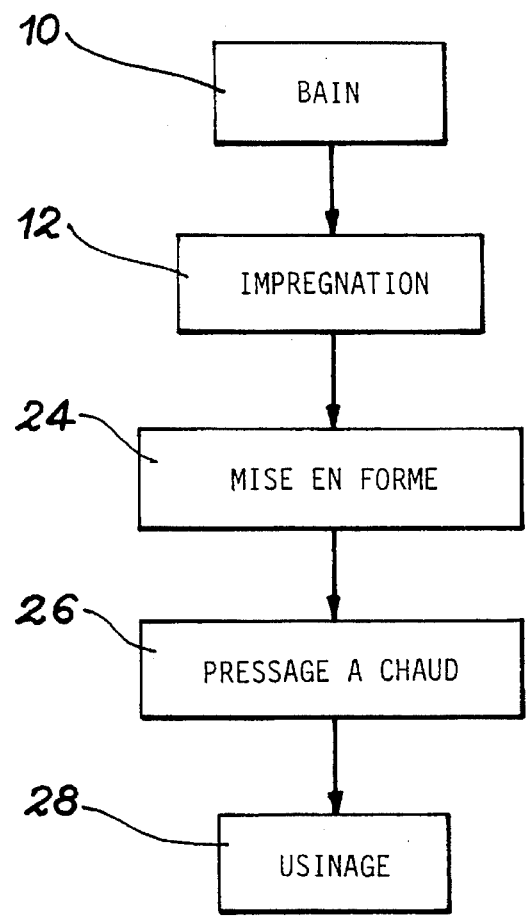

United States Patent
Hocquellet et al.

Patent Number: 5,491,000
Date of Patent: Feb. 13, 1996

[54] PROCESS FOR THE PRODUCTION OF A CARBON/CARBON COMPOSITE MATERIAL PART USING MESOPHASE POWDER

[75] Inventors: Dominique Hocquellet, Medard en Salles; Jean P. Chenier, Le Taillan Medoc, both of France

[73] Assignee: Aerospatiale Societe Nationale Industrielle, Paris, France

[21] Appl. No.: 22,728

[22] Filed: Feb. 24, 1993

[30] Foreign Application Priority Data

Feb. 28, 1992 [FR] France ................. 92 02386

[51] Int. Cl.$^6$ ............... B05D 5/12; B32B 9/00
[52] U.S. Cl. ............... 427/113; 428/408; 501/88
[58] Field of Search .............. 428/408; 427/113; 501/88

[56] References Cited

U.S. PATENT DOCUMENTS

| | | | |
|---|---|---|---|
| 3,917,884 | 11/1975 | Jahn | 427/228 |
| 4,321,154 | 3/1982 | Ledru | 252/62 |
| 4,409,048 | 10/1983 | Hatch et al. | 156/155 |
| 4,868,037 | 9/1989 | McCullough, Jr. et al. | 428/222 |

FOREIGN PATENT DOCUMENTS

| | | |
|---|---|---|
| 0280233 | 8/1988 | European Pat. Off. |
| 0340697 | 11/1989 | European Pat. Off. |
| 0379328 | 7/1990 | European Pat. Off. |
| 0402915 | 12/1990 | European Pat. Off. |
| 2493295 | 5/1982 | France |
| 2506779 | 12/1982 | France |
| 2531721 | 2/1984 | France |
| 2643897 | 9/1990 | France |
| 2714364 | 10/1978 | Germany |
| 92/01648 | 2/1992 | WIPO |

Primary Examiner—Peter A. Nelson
Attorney, Agent, or Firm—Pearne, Gordon, McCoy & Granger

[57] ABSTRACT

Process for the production of a carbon/carbon composite material using mesophase powder.

The process according to the invention comprises the stages of dispersing infusible mesophase microspheres in a solution containing a binder and a solvent able to wet the carbon fibres and thus form an impregnation bath (20), the binder and the solvent not being carbon precursors, impregnating each fibre (1) by the bath, placing (24) the impregnated fibres in a mould and unidirectionally pressing or compressing (26) the impregnated fibres in the mould whilst heating them to a first temperature $T_1$ above ambient temperature suitable for evaporating the solvent and the binder and making the mesophase microspheres flow to a second temperature $T_2$ above the first temperate and suitable for pyrolyzing the mesophase microspheres in coke form.

18 Claims, 2 Drawing Sheets

PROCESS FOR THE PRODUCTION OF A CARBON/CARBON COMPOSITE MATERIAL PART USING MESOPHASE POWDER

DESCRIPTION

The present invention relates to the production of a composite material mechanical part using high performance carbon fibres densified by the hot pressing or pressure sintering of a mesophase powder.

The composite material mechanical parts to which the invention applies are formed by carbon reinforcing fibres embedded in a carbon matrix. The fibres can be short or long, oriented in one, two, three, four or more directions in space and can be arranged in a random or organized manner. They can be coiled, braided, interwoven, woven, organized in strand form, etc.

The carbon/carbon composite material parts have very high thermomechanical strength levels. They are more particularly intended for use in spacecraft (shuttles or aircraft), friction pads for brakes and brake disks. In the space field, these parts are in particular intended for the production of noses, ailerons, leading edges and nozzles of a spacecraft.

The invention also applies to other industrial sectors requiring the use of refractory material parts having good mechanical properties such as e.g. for producing jet engines, in the competition sports field (cars, nautical), as well as in applications where it is the carbon element which is required, e.g. in the nuclear field.

Unlike in other fields, the aim is to adapt carbon/carbon composite materials to the final applications in a very precise manner. At present, the production technologies make it possible to orient the reinforcing fibres in the directions of the stresses to which said parts are exposed. In composite materials, the carbon matrix can be deposited on the fibres, either by a gaseous or by a liquid procedure.

In the case of the gaseous procedure, a fibrous preform or blank of the part to be produced is exposed to a carbon-containing gas flow, whose molecules decompose in contact with the fibres. The gas is generally an alkane such as methane or an alkene, e.g. ethylene. The temperatures used are very high and generally exceed 1000° C.

This procedure makes it possible to obtain very high quality matrixes. However, in order to correctly densify the fibrous reinforcements, it is necessary for them to have in their interior numerous pores. Therefore, this procedure is limited with respect to the choke of reinforcements. In particular, it is difficult to carry out for woven, multidirectional, fibrous preforms.

In addition, it is difficult for the end products obtained to have less than 15% porosity for deposition times which can thousands of hours. Therefore this procedure is long and expensive and the high porosity level somewhat weakens the matrix and in particular favours its oxidation at high temperatures and in the presence of oxidizing gases.

In the case of the liquid procedure, a liquid impregnating agent, which is a carbon precursor is allowed to penetrate the fibrous preform and as a result of a subsequent heat treatment it is transformed into coke (i.e. carbon). The liquid precursor is either a resin, generally of the phenol formaldehyde type, or a natural pitch or tar. The latter results from the distillation of coal or petroleum.

The annealing of these precursors is accompanied by the giving off of gas, so that even if the impregnation-annealing cycle is carefully carried out, it leads to a high residual porosity. In order to reduce said porosity, these impregnation-annealing cycles can be repeated the number of times considered necessary. These cycles can extend beyond 5, but are long and expensive. Moreover, as the resins and pitches are solid at ambient temperature, preform impregnation either takes place hot, or by the addition of an appropriate solvent.

Densification by a resin can be applied to large parts and can be carried out with the aid of relatively simple industrial equipment. However, generally the matrixes obtained cannot be readily graphited and therefore have a low density, tending to be in the form of glass and therefore leading to fragile materials limiting their fields of application.

With densification by pitch, better quality materials are obtained. Thus, the carbon matrixes can be more easily graphited, but they then lead to higher densities. However, this procedure uses complex and expensive means. Thus, the annealing of the pitch tends to throw the matrix out of the fibrous preforms and it must be carried out under high isostatic pressures, typically of $10^8$ Pa and at temperatures of approximately 1000° C. in order for the densification operation to have an adequate efficiency level.

With the need of carrying out several impregnation-annealing cycles, the procedure using pitch or tar is very expensive. Its cost and production time also increase very rapidly with the size of the parts to be produced. The procedure can also only be used for large parts (diameter 50 cm).

As densification by pitch leads to composite materials having a better quality than in other procedures, an attempt has been made to increase the densification efficiency by improving the pitch quality. The pitch efficiency is defined as the percentage by weight of solid coke which the pitch is able to give on heating it to approximately 900° C. in a neutral atmosphere. By improving this level, it is possible to reduce the porosity of the materials and therefore the number of impregnation-annealing cycles. The best pitches available on the market at present have a yield of 80%.

On using a pitch, either having a petroleum or a coal origin, it is transformed at 100° to 300° C. into an isotropic viscous liquid. By increasing the distillation temperature, a new liquid phase having anisotropic properties is obtained and then by further increasing the distillation temperature a coke is obtained. The isotropic liquid-anisotropic liquid and anisotropic liquid-coke transformation stages are irreversible.

Thus, the anisotropic phase is a liquid crystal phase in the conventional sense of the term, i.e. it is not a solid, but its crystallographic structure is that of a solid. In addition, its structure is lamellar being formed by planar molecules, which are organized edge to edge in order to constitute planes or lamellas. The various lamellas are stacked on one another in order to give a lamellar liquid crystal. This lamellar crystalline structure is due to the presence of molecules having an aromatic cycle in the initial pitch. This anisotropic phase is called the mesophase. Up to now this is the pitch product able to give the best coke yield. Generally this mesophase is able to produce coke with a 90% yield. It therefore constitutes a very advanced pitch state and its properties are different from those of pitches.

FR-A-2 643 897 envisages the production of a carbon-containing material reinforced by carbon fibres, by the in situ production of an artificial pitch according to the chemical process of polymerizing light hydrocarbon species by catalysis. The artificial pitch formed is a "sleeping" mesomorphic phase pitch, i.e. able to produce a mesomorphic phase and/or an isotropic pitch. The preimpregnated material obtained is then pressed.

It should be noted that a mesophase pitch generally contains no mesophase and is in fact only able to produce a mesophase.

EP-A-379 328 describes the production of a carbon/carbon composite material starting from a mixture of mesocarbon microspheres and carbon fibre precursors. In this process, production takes place of short pitch fibres of different lengths, typically 0.2 to 5 mm and they are mixed with mesocarbon microspheres and carbon-containing powder. The mixture obtained is placed in a mould and pressed to form composite bodies having predetermined shapes.

The pressure applied is between $10^8$ and $10^9$ Pa (1 to 10 tonnes/cm$^2$) with pressing temperatures of 20° to 500° C. and heating rates of 0.1° to 800° C. per hour. The pressed material is then sintered between 700° and 1300° C.

The mixture of more than two types of fibres of different lengths with mesocarbon microspheres is difficult to carry out in practice, so that this process cannot be industrialized. Moreover, the carbon content of the fibrous reinforcement obtained is much lower than that conventionally used, making the composite material obtained more fragile than the others.

EP-A-402 915 describes the production of a carbon/carbon composite material using more than two carbon fibre types of different length, graphite powder and coke powder as the charge, as well as mesophase pitch as the binder. These different constituents are mixed in the presence of adhesives and then placed in a mould heated to 600° C. and exposed to a pressure of $5 \times 10^7$ Pa (500 kg/cm). The product obtained then undergoes a carbonization stage at 1100° to 1200° C. and then a graphiting stage at between 2000° and 2500° C.

This process has several post-annealing stages following the moulding of the material at high temperatures exceeding 1000° C., increasing the production costs of the composite material.

The present invention aims at a novel process for the production of a carbon/carbon-type composite material part using mesophase powder making it possible to obviate the disadvantages referred to hereinbefore. In particular, this process makes it possible in a simpler way than in the prior art processes and therefore less expensively, to produce carbon/carbon material parts which are less fragile than the prior art parts. In particular, it permits the production in a single impregnation-annealing cycle of parts having a porosity below 11%, with very large dimensions and with reduced production costs. In particular, the process according to the invention makes it possible to produce carbon/carbon parts with a diameter of 2.3 m.

More specifically, the invention is directed at a process for the production of a composite material part having a reinforcement of carbon fibres embedded in a carbon matrix and incorporating the stages of dispersing infusible mesophase microspheres in a solution containing a binder and a solvent able to wet the carbon fibres and in this way form an impregnation bath, the binder and the solvent not being carbon precursors, impregnating each fibre by the bath, placing the impregnated fibres in a mould and unidirectionally pressing the impregnated fibres in the mould whilst heating them to a first temperature $T_1$ higher than ambient temperature and suitable for evaporating the solvent and the binder and for making the mesophase microspheres flow and then up to a second temperature $T_2$ higher than the first temperature and able to pyrolyze the mesophase microspheres in coke form.

This process makes it possible to obtain high performance, composite material parts in a single hot moulding-impregnation cycle. This process is much shorter than the prior art processes.

The fibres used in the invention can be long or continuous, such as those conventionally used for winding, each being constituted by several assembled filaments, or alternatively short fibres, which are usually unitary filaments.

When the fibres to be impregnated are long or continuous, according to a first variant the process of the invention involves the stages of preparing the impregnation bath, impregnating the fibres by said bath, producing unidirectional sheets or layers of impregnated fibres by placing them alongside one another in the same direction and stacking the layers or sheets in the mould, followed by the hot unidirectional pressing of the layer or sheet stack.

According to a second variant this process can involve the stages of preparing the impregnation bath, impregnating each continuous fibre by said bath, cutting each impregnated fibre into sections and putting into place the said sections in a mould and hot unidirectionally pressing the said sections. In this case, it is advantageous to calibrate each impregnated continuous fibre before cutting it. This calibration can be obtained by the continuous pultrusion of each impregnated fibre (passing into a diaphragm or die whilst pulling on the fibre), optionally followed by drying.

This variant makes it possible to produce a so-called "randon" composite material mechanical part by distributing in a randon manner the fibre sections obtained.

When the fibres are short, the process according to the invention involves the preparation of the impregnation bath, the mixing of said bath and the short fibres, the placing of the mixture in the mould and the hot unidirectional pressing of the mixture.

Thus, the mesophase microspheres constitute the grains of a powder with grain size variations between 4 and 20 µm as a function of the production procedure.

The mesophase powders used in the invention are in particular those produced according to the processes described in FR-A-2 531 721, FR-A-2 506 779 and FR-A-2 293 295. These powders are formed by the distillation of a coal or petroleum pitch at about 400° C. by a germination-growth procedure in the form of spheres, which are recovered by centrifuging. They have a high coke yield exceeding 90% and have a hot behaviour, i.e. at a temperature above approximately 350° C. similar to thermoplastics.

Due to the size of the mesophase spheres, according to the invention use is made either of continuous fibres with large elementary filaments of approximately 30 µm (and therefore a diameter close to that of the powder grains), or by spacing apart the filaments of said fibres in order to increase the space between them and thus enable the microspheres to penetrate the fibres.

The mesophase powder is an infusible material, unlike the mesophase or non-mesophase pitches. In addition, in order to ensure a homogeneous densification of the fibrous substrate, the heating of the impregnated fibres in the mould takes place progressively using several temperature levels with different heating rates.

The temperature $T_1$ is dependent on the nature of the mesophase and varies between 350° and 450° C., e.g. between 350° and 400° C.

Heating up to the temperature $T_I$ must be carried out as quickly as possible and advantageously at a rate higher than 200° C./h. This first heating stage is followed by the heating up to the temperature $T_2$ advantageously approximately 500° to 700° C. and typically approximately 600° C., at the slowest possible speed and preferably at below 1° to 100° C./h. This stage makes it possible to pyrolyze the mesophase powder.

The passage from the flow temperature $T_1$ to the pyrolysis temperature $T_2$ must take place as slowly as possible in order to avoid the shattering of the composite material part.

Advantageously, at above the temperature $T_2$, there is then an additional heating to a temperature $T_3$ of approximately 800° to 1000° C. and typically approximately 900° C., completing the pyrolysis and ensuring the sintering of the carbon. This stage is advantageously performed at a speed of at least 100° C./h. This stage can extend to graphiting between 2400° C. and 2800° C. in order to increase the density.

Unlike in the prior art processes, the shaping of the part and its sintering are performed simultaneously with pressing. Advantageously, pressing takes place at between $2\times10^7$ Pa and $10^8$ Pa (0.2 to 1 tonne/cm$^2$) and in practice use is made of pressures of $3\times10^7$ to $5\times10^7$ (300 to 500 mg/cm$^2$).

The use of hot unidirectional pressing enables the carbon-containing matrix to follow the shrinkage of the parts during the pyrolysis operation. This shrinkage occurs as a result of the elimination of the non-carbon constituents of the mesophases ($H_2$, $O_2$), but also as a result of the increase of the density of the substrate associated with the matrix.

As a result of this hot unidirectional pressing ($> T_1$), there is a reduction of the porosity of the materials and the cracking thereof due to the giving off of gas.

The parts obtained in a single impregnation-hot moulding cycle are approximately 11%, which is below what is obtained by the gaseous procedure and which corresponds to the level obtained with the conventional pitch procedure after three impregnation-annealing cycles.

Various pressing procedures can be used according to the invention. In particular, it is possible to use compression appropriate both for continuous fibre and short fibre parts, together with injection pressing suitable for short fibres mixed with graphite powder.

The process according to the invention also differs from the prior art processes using mesophase spheres through the use of an impregnation bath in which are suspended or dispersed the mesophase spheres. This dispersion is necessary for ensuring a homogeneous distribution of the mesophase microspheres around the fibres and provided that the microspheres are not fusible.

The bath contains 0.5 to 5% by weight binder, 25 to 75% by weight solvent of said binder and 24.5 to 74.5% by weight of carbon-containing solid materials. The carbon-containing solid materials are either mesophase powder when long fibres are used, or mesophase powder and fibres, when the latter are short.

The solvents and binders are used solely for impregnating the fibres. In addition, these solvents and binders must not be precursors of carbon and in particular their molecules must have no aromatic cycle.

The solvent used in the impregnation bath must be able to wet the fibres, as well as being a solvent for the binder. Moreover, when using water as the binder, it is preferable to add to the solution a surfactant, which is generally a fatty acid ester.

The binder serves to bind together the microspheres and also to bind them to the fibres following the evaporation of the solvent. It can be a liquid organic polymer or a monomer or a mixture of polymers or organic monomers. These polymers are essentially thermoplastics.

The binder can be constituted by polymethyl methacrylate (PMMA), polyvinyl chloride, polyvinyl alcohol (PVA), polyethylene, which are soluble in most organic solvents or mixtures thereof.

Very varied solvents can be used. They preferably have a low vapour tension ( $<10^4$ Pa) and a low boiling point ($<120°$ C.). Solvents usable in the invention are water, acetonitrile, lower primary alcohols such as ethanol, methanol, n-propanol or lower halogenated alkanes such as dichloromethane, chloroform, dichloroethane, acetone, ethyl acetate, tetrahydrofuran, dichlorobenzene, etc.

Advantageously, it is possible to add graphite powder at a content representing 0 to 40% by weight of the carbon-containing solid materials in the impregnation bath. During hot moulding, this powder will be transformed, like the mesophase, into coke. This powder is more specifically used in the case of short fibres. Its grain size is advantageously 1/10 that of the diameter of the fibres.

Continuous carbon fibres make it possible to obtain composite material parts having better characteristics than when using short fibres. Conversely, the use of the latter makes it possible to produce parts with more complex shapes. These fibres can be woven, braided, interwoven and oriented in one or more directions in space.

The invention is described in greater detail hereinafter relative to a non-limitative embodiment and the attached drawings, wherein show:

FIG. 1 Diagrammatically the different stages of the process according to the invention.

Figure 2:
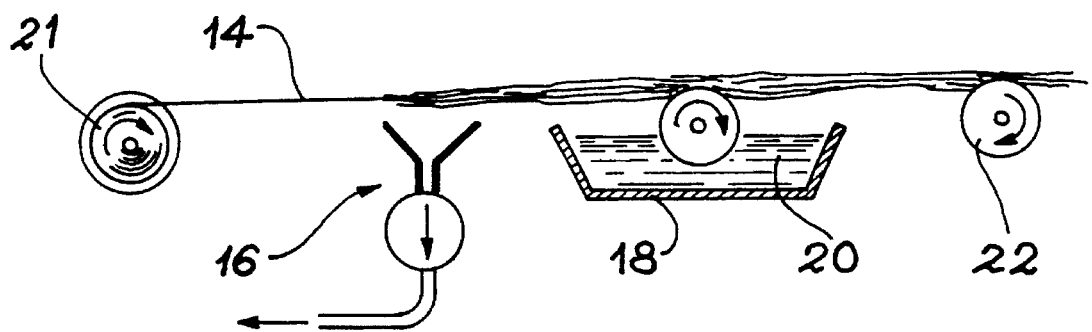
Figure 3:
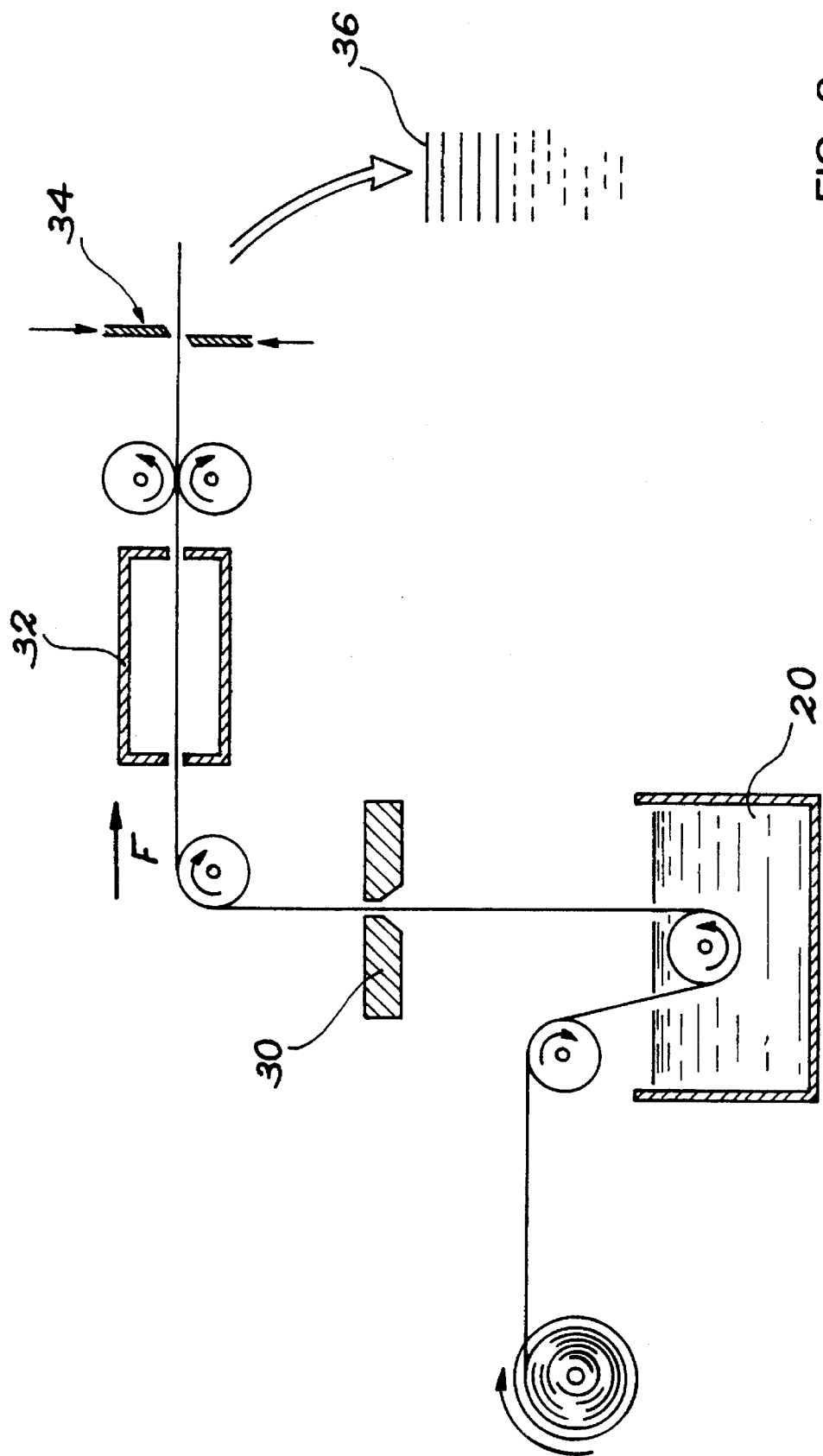

FIG. 2 & 3 The stages of impregnating continuous fibres according to the invention.

The first stage of the process according to the invention and represented by block 10 in FIG. 1 consists of preparing an impregnation bath by the dispersion of a mesophase microsphere powder in a solution containing a non-cokable, thermoplastic organic binder and an aqueous or organic solvent able to solubilize the binder and wet the carbon fibres. The powder has a grain size of 4 to 20 μm, as a function of its production.

The impregnation bath contains 25 to 75% by weight solvent, or preferably 40 to 59% by weight thereof, 0.5 to 5% by weight binder soluble in the solvent or preferably 1 to 3% thereof and 24.5 to 74.5% by weight of solid materials, or preferably 40 to 59% thereof.

The following stage of the process consists of impregnating the fibres by the bath. In the case of short fibres to be impregnated, they are added to the impregnation bath at ambient temperature.

In this case, the solid materials can be constituted by 10 to 70% or preferably 55 to 65% by weight fibres, 90 to 30% and preferably 40 to 25% by weight mesophase powder and 0 to 40% or preferably 5 to 10% by weight graphite powder. The graphite powder has a grain size identical to that of the mesophase and is between 4 and 20 μm.

When the fibres to be impregnated are continuous, impregnation takes place in the manner shown in FIG. 2. To this end, a continuous fibre 14 is unwound from its reel 21 and moves above a suction-type fibre spacing system 16, before passing into an impregnation tank 18 at ambient temperature and which contains the impregnation bath 20. This bath has the same composition as that given hereinbefore for the short fibres, except that the solid materials are only constituted by mesophase microspheres.

The charged fibre can then be wound onto a support 20, so as to form unidirectional layers by the arrangement of the fibres alongside one another and parallel to the same direction.

The following stage of the process consists of pouring the fibre-powder-mesophase mixture into a mould, namely placing the impregnated fibre layers in a mould corresponding to the shape of the part to be produced. This shaping stage carries the reference 24.

When the fibres are continuous, the fibre layers are stacked in the mould in such a way that the fibres of one layer form an angle of 0° to 90° with the fibres of adjacent layers, so that it is possible to obtain a fabric.

The following stage of the process represented by the block 26 in FIG. 1 consists of hot unidirectional pressing of the impregnated fibres in the mould. Pressing takes place at a pressure of $2 \times 10^7$ Pa to $10^8$ Pa (0.2 to 1t/cm$^2$) and in practice $3 \times 10^7$ Pa to $5 \times 10^7$ Pa (300 to 500 kg/cm$^2$).

The mould is that conventionally used for the production of thermosetting plastics material parts by compression.

Surprisingly, the inventors have found that this type of mould and pressing was adequate for obtaining high mechanical performance carbon/ carbon parts without having to use a complex system for applying an isostatic pressure to the part. Throughout the duration of the unidirectional pressing, three heating stages are performed.

The first stage consists of a fast heating up to a mesophase flow temperature $T_1$ between 350° and 400° C. Heating to $T_1$ takes place rapidly at a speed exceeding 200° C./h. The temperature $T_1$ is then maintained for 0 to 60 minutes.

This is followed by the slowest possible second heating of the fibres in order to bring them from the temperature $T_1$ to a temperature $T_2$ of approximately 600° C. at a speed below 1° to 100° C./h and preferably below 1° to 60° C./h. The temperature level $T_2$ is maintained for 0 to 15 minutes. It ensures the transformation of the mesophase powder and optionally the graphite powder into coke.

If necessary, this is followed by a third temperature rise up to a temperature $T_3$ of approximately 900° C. The temperature rise rate is intermediate between the two preceding rises and is typically approximately 100° C./h. The temperature $T_3$ is then maintained for 30 minutes to 2 hours and ensures the sintering and graphiting of the coke matrix.

The part is then allowed to cool to ambient temperature and can undergo a final working or machining stage represented by the block 28.

In a performance variant illustrated in FIG. 3, the impregnation takes place continuously on the roll of a continuous fibre in the bath 20, without spacing apart the fibre filaments. The impregnated fibre is then continuously pultruded (i.e. drawn in the direction indicated by F) in a die or diaphragm 30 at a slow speed and is then dried in an oven 32 at a temperature which is a function of the fibre passage speed. The impregnated continuous fibre obtained consequently has a calibrated diameter, is semi-rigid and flexible.

It is then cut, in the manner indicated at 34, into sections 36, which are arranged in a random manner in the mould and preferably in such a way that the fibre sections are oriented in a plane normal to the pressing axis of the sections in the mould.

EXAMPLE 1: Production of a carbon/carbon part with short fibres.

Firstly an impregnation bath is formed by adding 100 parts by weight water, 3 parts by weight polyvinyl alcohol, 1 part by weight surfactant, 80 parts by weight mesophase powder and 20 parts by weight carbon fibres.

The surfactant is octylphenoxypolyethoxyethanol such as that marketed under the reference Triton X100. The mesophase powder is in particular that sold by Kawasaki Steel Corporation under the reference KMFC (00322) and the short fibres are those sold e.g. under the reference VMD by Union Carbide. These fibres result from the pyrolysis of a coal tar and have a length of approximately 600 μm and a diameter of approximately 30 μm.

This bath is then placed in a stainless steel mould. Unidirectional pressing takes place at $5 \times 10^7$ Pa (0.5t/cm$^2$) with a first temperature level of 380° C. for 25 minutes and with a temperature rise rate to $T_1$ of 400° C./h.

This is followed by heating at a temperature T of 600° C. whilst maintaining a pressing of $5 \times 10$ Pa (0.5t/cm$^2$). The temperature rise from 385° C. to 600° C. is performed at a typical rate of 30° C./h. The temperature is kept at about 600° C. for 1 hour, followed by heating to 2600° C. for graphiting. The part obtained has a porosity of 11% and can be machined. Under these conditions diameter 70 mm and respectively 5 and 10 mm disks were produced.

EXAMPLE 2

This example differs from Example 1 by the use of PMMA in place of polyvinyl alcohol and dichlorobenzene in place of water. In addition, there is no surfactant in the impregnation bath. The bath proportions and the part production conditions are the same as given in Example 1.

EXAMPLE 3: Producing a carbon/carbon material part from continuous fibres.

The impregnation bath is as described in Example 1, except that there are no short carbon fibres. The continuous fibre used has 3000 filaments and is marketed by Toray under the reference T300 and has a diameter of 10 μm.

Following the spacing apart of the fibre filaments by suction, it is impregnated with the above bath. Several unidirectional layers (15 in all) preimpregnated mesophase fibres are produced. These layers are then stacked on one another in such a way that the fibres form angles of 45° between the individual layers. Pressing takes place in the manner described in Example 1.

EXAMPLE 4

This example differs from Example 1 through the composition of the impregnation bath. The latter contains 60 parts by weight short fibres, 8 parts by weight graphite powder and 32 parts by weight mesophase in place of 20 parts by weight fibres and 80 parts by weight mesophase as in EXAMPLE 1. The graphite powder has a grain size of approximately 1 μm and is in particular that sold by ACHESON under the reference DAG 386.

The porosity of the part obtained is 11%.

EXAMPLE 5: Producing a "random" carbon/carbon material part.

Firstly a dispersion of the mesophase microspheres in an aqueous acid solution at approximately pH 4 takes place. The use of an acid solution stabilizes the dispersion of the microspheres. The bath obtained contains 6 parts by weight PVA, 100 parts by weight water and 100 parts by weight mesophase microspheres and has a viscosity of approximately 900 MPa/s.

A continuous fibre with 3000 filaments is passed at a speed of 1 mm/min successively into an impregnation bath, a die calibrating the fibre to a diameter of approximately 1 mm and an oven heated to 150° C. The fibre is then cut into approximately 10 mm sections. The latter are placed in a graphite mould, so that their longitudinal axis is oriented in a plane normal to the pressing axis. Unidirectional pressing takes place hot under nitrogen and a pressure of 35 MPa. The pressing temperatures are $T_1=380°$ C., $T_2=600°$ C. and $T_3=1200°$ C. and the temperature rise rates are in accordance with EXAMPLE 1.

We claim:

1. Process for the production of a composite material part having a carbon fibre reinforcement embedded in a carbon matrix involving the stages of dispersing infusible mesophase microspheres in a solution containing a binder and a solvent able to wet the carbon fibres and thus form an impregnation bath (20), the binder and the solvent not being carbon precursors, impregnating each fibre (1) by the bath, placing (24) the impregnated fibres in a mould and unidirectionally pressing (26) the impregnated fibres in the mould whilst heating them to a first temperature $T_1$ exceeding ambient temperature and able to evaporate the solvent and the binder and make the mesophase microspheres flow and then to a second temperature $T_2$ exceeding the first temperature and able to pyrolyze the mesophase microspheres in coke form.

2. Process according to claim 1, characterized in that the fibres (14) are continuous and in that the stages are the preparation of the impregnation bath, the impregnation (12) of the fibres by said bath, the formation of unidirectional layers of impregnated fibres by placing them alongside one another in the sane direction, stacking the layers in the mould and hot unidirectional pressing of the layer stack.

3. Process according to claim 2, characterized in that the filaments of the continuous fibres are spaced apart (16).

4. Process according to claim 1, characterized in that the fibres are short and the stages consist of preparing the impregnation bath, mixing the said bath and the short fibres, placing the mixture in the mould and hot unidirectionally pressing the mixture.

5. Process for the production of a composite material part having a carbon fibre reinforcement embedded in a carbon matrix, said fibres being continuous, involving the stages of dispersing infusible mesophase microspheres in a solution containing a binder and a solvent able to wet the carbon fibres and thus form an impregnation bath, the binder and the solvent not being carbon precursors, preparing the impregnation bath, impregnating each continuous fibre by said bath, cutting each impregnated fibre into sections, placing the impregnated fibre sections in a mould and unidirectionally pressing said sections in the mould whilst heating them to a first temperature $T_1$ exceeding ambient temperature and able to evaporate the solvent and the binder and make the mesophase microspheres flow and then to a second temperature $T_2$ exceeding the first temperature and able to pyrolyze the mesophase microspheres in coke form.

6. Process according to claim 5, characterized in that each continuous impregnated fibre is calibrated before cutting it.

7. Process according to claim 1, characterized in that the impregnation bath contains 25 to 75% by weight solvent, 0.5 to 5% by weight binder and 24.5 to 74.5% by weight carbon-containing solid materials formed at least partly from mesophase microspheres.

8. Process according to claim 7, characterized in that the carbon-containing solid materials contain 10 to 70% by weight short fibres and 90 to 30% by weight mesophase.

9. Process according to claim 8, characterized in that into the impregnation bath is introduced graphite powder representing 0 to 40% by weight of the carbon-containing solid materials.

10. Process according to claim 1, characterized in that the mesophase microspheres have a diameter close to that of the fibres.

11. Process according to claim 1, characterized in that the mesophase microspheres have a diameter of 4 to 20 μm.

12. Process according to claim 1, characterized in that the temperature T is $\geq 350°$ C.

13. Process according to claim 1, characterized in that the heating of the impregnated fibres up to the first temperature $T_1$ is performed rapidly at a speed exceeding 200° C./h.

14. Process according to claim 1, characterized in that the temperature $T_2$ is between 500° and 700° C.

15. Process according to claim 1, characterized in that the heating of the fibres up to the second temperature $T_2$ takes place at a speed below 100° C./h.

16. Process according to claim 1, characterized in that the pressed fibres are heated in the mould to a third temperature $T_3$ above the second temperature $T_2$.

17. Process according to claim 16, characterized in that the temperature $T_3$ is at least 800° C.

18. Process according to claim 1, characterized in that pressing takes place at a temperature of $2\times10^7$ Pa to $10^8$ Pa.

* * * * *